(12) United States Patent
Kitashou (10) Patent No.: US 10,229,474 B2
(45) Date of Patent: Mar. 12, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tetsurou Kitashou, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/596,527

(22) Filed: Jan. 14, 2015

(65) Prior Publication Data

US 2015/0213585 A1 Jul. 30, 2015

(30) Foreign Application Priority Data

Jan. 30, 2014 (JP) ................................. 2014-016199

(51) Int. Cl.
  G06T 5/00 (2006.01)
  G06T 5/20 (2006.01)
  G06T 3/40 (2006.01)
(52) U.S. Cl.
  CPC .................................. G06T 3/4007 (2013.01)
(58) Field of Classification Search
  CPC .................................................... G06T 3/4007
  USPC ......................................................... 345/609
  See application file for complete search history.

(56) References Cited

U.S. PATENT DOCUMENTS 5,598,482 A * 1/1997 Balasubramanian .... H04N 1/40
  382/163
6,496,609 B1* 12/2002 Walter .................. G06T 3/4007
  358/525
2005/0094893 A1* 5/2005 Samadani .............. H04N 19/60
  382/275
2006/0104538 A1* 5/2006 Izumi ...................... G06T 5/002
  382/275
2009/0091660 A1* 4/2009 Wang ........................ H04N 9/68
  348/649
2010/0060745 A1* 3/2010 Fukuta ............... H04N 5/23248
  348/208.6

(Continued)

FOREIGN PATENT DOCUMENTS

JP 3706206 B2 10/2005
JP 2006-174285 A 6/2006

(Continued)

OTHER PUBLICATIONS

Japanese Office Action dated Dec. 22, 2017 in corresponding Japanese Patent Application No. 2014-016199 together with English translation, 7 pages.

*Primary Examiner* — Samantha (Yuehan) Wang
(74) *Attorney, Agent, or Firm* — Carter, DeLuca, Farrell & Schmidt, LLP (57) ABSTRACT

A pixel position to be mapped to each pixel position on an output image by deformation is obtained as an input pixel position. A filter coefficient group to be used for pixel interpolation at the time of deformation is adjusted by using the pixel values of pixels positioned around an input pixel position on the input image. A pixel value at the pixel position on the output image which corresponds to the input pixel position is calculated by using the pixel values of the pixels positioned around the input pixel position on the input image and the filter coefficient group after adjustment.

9 Claims, 6 Drawing Sheets

(56) References Cited

U.S. PATENT DOCUMENTS

2011/0170803 A1* 7/2011 Yokoi .................. G06T 3/4007
382/300
2013/0315489 A1* 11/2013 Uchiyama ............. G06T 7/0085
382/199

FOREIGN PATENT DOCUMENTS

| JP | 2008-167027 A | 7/2008 |
|----|---------------|--------|
| JP | 4762115 B2 | 8/2011 |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image deformation technique.

Description of the Related Art

In many cases, an image processing apparatus is required to perform image transformation process. For example, a projector product performs image transformation process called keystone (trapezoidal) deformation processing. More specifically, when output light from the projector is projected on the screen, a valid area projected on the screen is deformed in a trapezoidal shape due to the installation tilt angle of the projector, an optical lens shift, or the like. It is hard for a user to view a valid area kept deformed in a trapezoidal shape. For this reason, image transformation process is performed to deform the valid area into an inverted trapezoidal shape, thereby deforming the valid area projected on the screen into a rectangular shape. This image transformation process is generally known as keystone (trapezoidal) deformation processing.

In order to perform image transformation process, it is necessary to perform the processing of referring to a plurality of pixels of an input image before deformation and generating each pixel of the image after the deformation by interpolating these pixels. As this technique, for example, a bicubic interpolating process is generally known. In a bicubic interpolating process, each pixel of an image after deformation is calculated by referring to 4×4 pixels of the image before the deformation and calculating the total sum of the products of the respective pixels and weighting coefficients defined in the bicubic interpolating process. A bicubic interpolating process has a sharpening effect and the effect of obtaining a clear image with enhanced edges after the process. On the other hand, however, this process has an undesired influence on an image originally having an edge before deformation. That is, the edge is excessively enhanced. This influence is generally known as ringing. Ringing appears on an image such that an excessively enhanced portion of the image looks different in color tint from the image before the deformation. As described above, ringing has a feature that it occurs more easily in a non-flat area (in other words, an area with an edge) of an image than in its flat area.

Japanese Patent No. 4762115 discloses a method of reducing ringing by changing the number of reference pixels in pixel interpolation processing in accordance with the flatness of each area of an image. More specifically, pixel interpolation processing with a large number of reference pixels, which has a high sharpening effect but easily causes ringing, is applied to a flat area in which ringing does not easily occur. On the other hand, pixel interpolation processing with a small number of reference pixels, which has a low sharpening effect but does not easily cause ringing, is applied to a non-flat area in which ringing easily occurs. Japanese Patent No. 4762115 suppresses the occurrence of ringing by switching the types of processing in this manner.

In addition, Japanese Patent No. 3706206 discloses a method of correcting the pixel values of reference pixels in pixel interpolation processing in accordance with the flatness of each area of an image. More specifically, pixel interpolation processing is performed for a flat area, in which ringing does not easily occur, without correcting the pixel values of reference pixels in pixel interpolation processing. On other hand, pixel interpolation processing is performed for a non-flat area, in which ringing easily occurs, upon correcting the pixel values of reference pixel in pixel interpolation processing so as to flatten the pixel values of the reference pixels. Japanese Patent No. 3706206 suppresses the occurrence of ringing by switching the type of processing in this manner.

Although Japanese Patent No. 4762115 discloses the method of changing the number of reference pixels in pixel interpolation processing in accordance with the flatness of each area of an image, pixel interpolation processing with a large number of reference pixels has a problem that the amount of processing increases in proportion to the square of one side of an area corresponding to the number of reference pixels. If, for example, the number of reference pixels is changed from 4×4 pixels to 8×8 pixels exemplified in Japanese Patent No. 4762115, the amount of processing increases at least four times in proportion to the square of one side of an area corresponding to the number of reference pixels, resulting in an increase in implementation cost.

Japanese Patent No. 3706206 discloses the method of correcting the pixel values of reference pixels in pixel interpolation processing in accordance with the flatness of each region of an image. This method, however, has a problem that in a non-flat area, in which ringing easily occurs, color tint changes before and after pixel interpolation processing regardless of the influence of ringing.

SUMMARY OF THE INVENTION

The present invention has been made in consideration of the above problems, and provides a technique for performing image deformation while suppressing ringing.

According to the first aspect of the present invention, there is provided an image processing apparatus which outputs a transformation image obtained by deforming an input image, the apparatus comprising: a specifying unit configured to specify a plurality of coordinate points on the input image which correspond to a coordinate point on the transformation image; a calculation unit configured to calculate an evaluation value corresponding to a difference between a plurality of pixel values corresponding to the plurality of coordinate points which have been specified; a processing unit configured to execute, in a case where the evaluation value is not less than a threshold, pixel processing with a lower degree of edge enhancement to the plurality of pixel values than in a case where the evaluation value is less than the threshold; and an output unit configured to output pixel values obtained by the pixel processing as pixel values of the transformation image.

According to the second aspect of the present invention, there is provided an image processing method of outputting a transformation image obtained by deforming an input image, the method comprising: a specifying step of specifying a plurality of coordinate points on the input image which correspond to a coordinate point on the transformation image; a calculation step of calculating an evaluation value corresponding to a difference between a plurality of pixel values corresponding to the plurality of coordinate points which have been specified; a processing step of executing, in a case where the evaluation value is not less than a threshold, pixel processing with a lower degree of edge enhancement to the plurality of pixel values than in a case where the evaluation value is less than the threshold; and an output step of outputting pixel values obtained by the pixel processing as pixel values of the transformation image.

According to the third aspect of the present invention, there is provided a storage medium storing a program configured to be read by a computer which outputs a transformation image obtained by deforming an input image, the program causing the computer to execute a specifying step of specifying a plurality of coordinate points on the input image which correspond to a coordinate point on the transformation image; a calculation step of calculating an evaluation value corresponding to a difference between a plurality of pixel values corresponding to the plurality of coordinate points which have been specified; a processing step of executing, in a case where the evaluation value is not less than a threshold, pixel processing with a lower degree of edge enhancement to the plurality of pixel values than in a case where the evaluation value is less than the threshold; and an output step of outputting pixel values obtained by the pixel processing as pixel values of the transformation image.

Further features of the present invention will become apparent from the following description of exemplary embodiments (with reference to the attached drawings).

DESCRIPTION OF THE EMBODIMENTS

The embodiments of the present invention will be described below with reference to the accompanying drawings. Note that each embodiment described below will exemplify a case in which the present invention is specifically carried out, and is a specific embodiment of an arrangement described in the scope of claims.

First Embodiment

This embodiment will describe an image processing technique of generating an output image obtained by deforming (transforming) an input image. An example of the functional arrangement of an image transformation apparatus (image processing apparatus) 100 which executes such an image processing technique will be described first with reference to the block diagram of FIG. 1.

Figure 1:
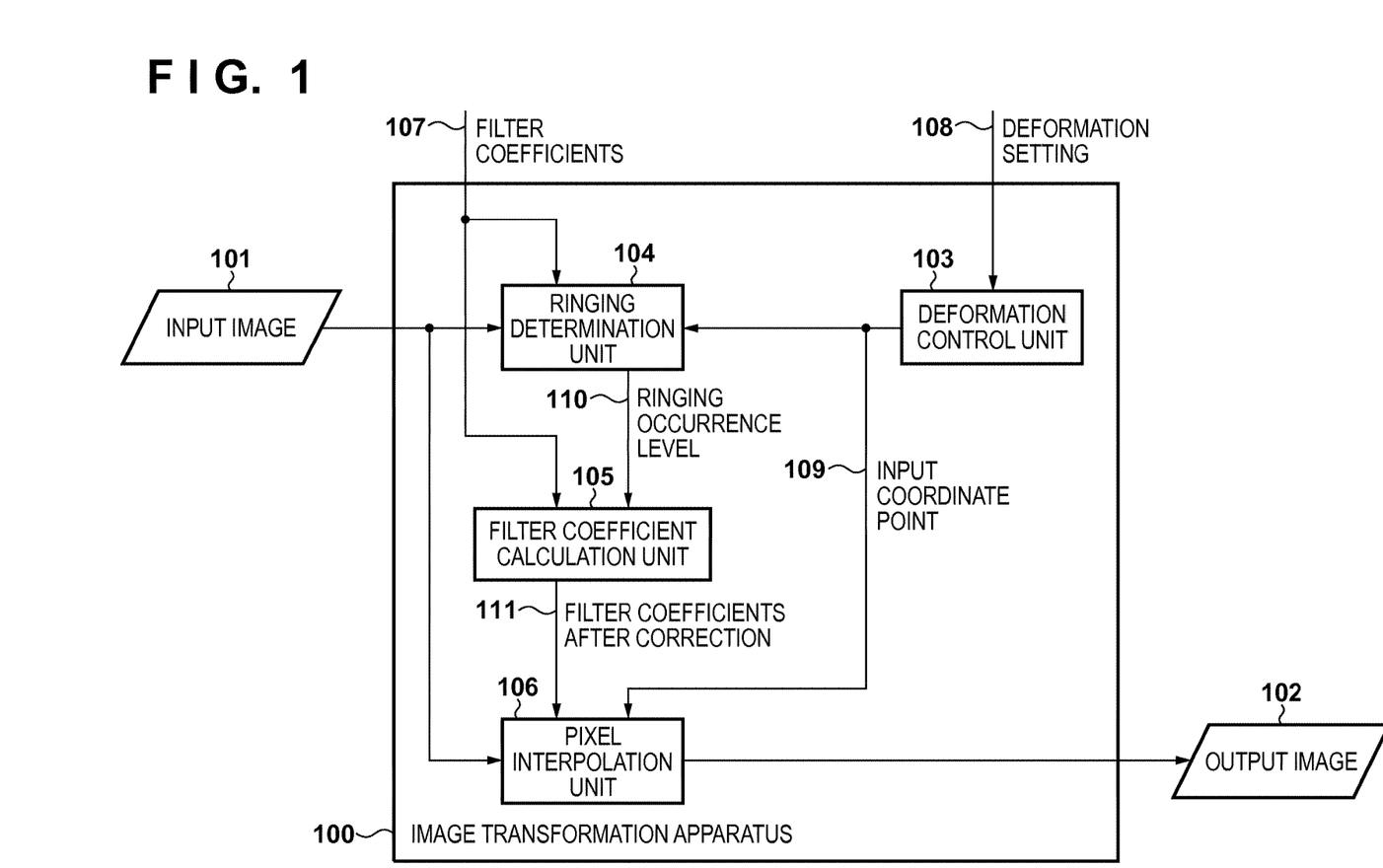
FIG. 1 is a block diagram showing an example of the functional arrangement of an image transformation apparatus 100.

The image transformation apparatus 100 generates and outputs an output image 102 by using an input image 101, filter coefficients (filter coefficient group) 107 used for pixel interpolation when performing the above deformation, and a deformation setting 108 indicating the geometrical correspondence relationship between the input image 101 and the output image 102.

A deformation control unit 103 obtains, as an input pixel position (input coordinate point 109), a pixel position mapped to each pixel position (output coordinate point) on the output image 102 by the above deformation using the deformation setting 108. The deformation setting 108 is information describing the correspondence relationship between the coordinate positions of the four corners of the input image 101 and the coordinate positions of the four corners of the output image 102. Since the technique of obtaining the input coordinate point 109 mapped to each output coordinate point on the output image 102 by the above deformation using such information is known, a description of the technique will be omitted. Processing performed by the deformation control unit 103 will be described with reference to the flowchart of FIG. 2.

Figure 2:
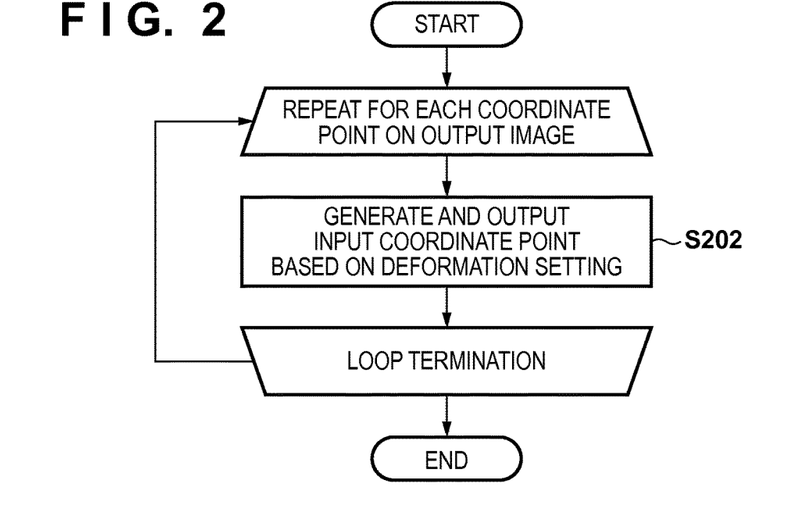
FIG. 2 is a flowchart of processing performed by a deformation control unit 103.

As shown in FIG. 2, the deformation control unit 103 performs the processing in step S202 for each output coordinate point on the output image 102 to obtain the input coordinate point 109 mapped to each output coordinate point by the above deformation.

More specifically, in step S202, the deformation control unit 103 refers to the deformation setting 108, performs projection interpolation for the input coordinate point 109 mapped to each output coordinate point by the above deformation based on the four corner coordinate points of the input image 101 and the four corner coordinate points of the output image 102, and outputs the resultant information.

Referring back to FIG. 1, the ringing determination unit 104 receives the filter coefficients 107, the input image 101, and the input coordinate point 109. A ringing determination unit 104 determines by using these pieces of information whether ringing easily occurs in pixels positioned around the input coordinate point 109 on the input image 101. The ringing determination unit 104 outputs this determination result as a ringing occurrence level 110.

In this embodiment, a pixel interpolation unit 106 (to be described later) performs a bicubic interpolating process by referring to 4×4 pixels. In this case, therefore, the filter coefficients 107 include 16 (=4×4 pixels) coefficients from about −0.5 to +1.0 for determining weighting of each pixel. A bicubic interpolating process and a coefficient calculation method used for this process are known.

Figure 3:
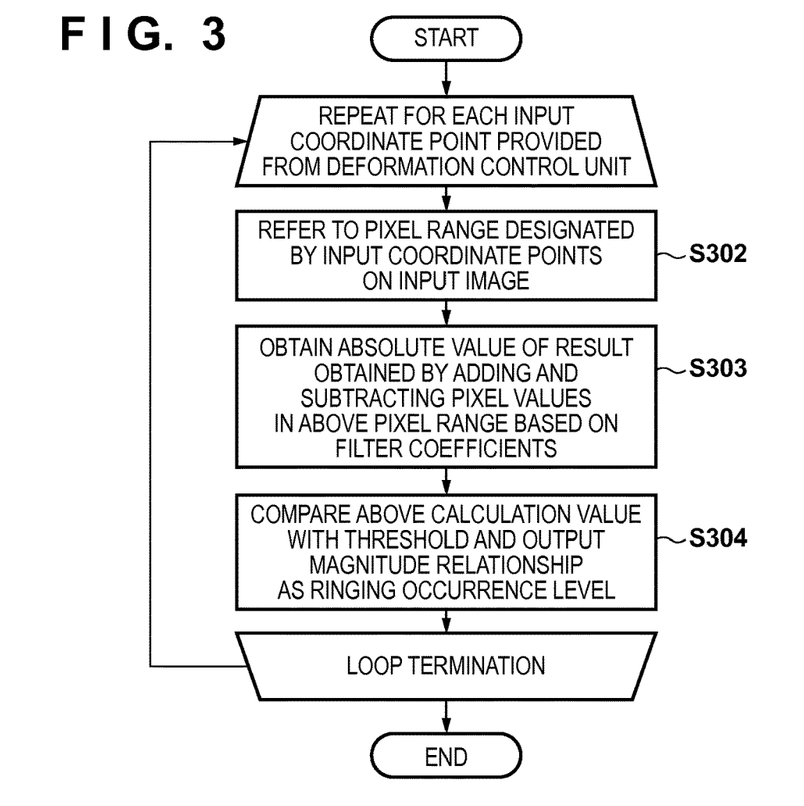
FIG. 3 is a flowchart of processing performed by a ringing determination unit 104.

Processing performed by the ringing determination unit 104 will be described with reference to the flowchart of FIG. 3. As shown in FIG. 3, the ringing determination unit 104 obtains and outputs the ringing occurrence level 110 corresponding to each input coordinate point 109 obtained by the deformation control unit 103.

In step S302, a pixel group positioned around the input coordinate point 109 is specified (referred to) on the input image 101. For example, a total of 16 pixels (4×4 pixels) including 4 pixels (2×2 pixels) surrounding the input coordinate point 109 and 12 pixels surrounding the 4 pixels.

In step S303, a value diff representing that ringing easily occurs with respect to the input coordinate point 109 is obtained by using the pixel group specified in step S302 and the filter coefficients 107. The larger the value of diff, the higher ringing easily occurs. The processing in this step will be described in detail blow.

In step S304, diff obtained in step S303 is compared in magnitude with a predetermined threshold diff_threshold. If this magnitude comparison result indicates that diff≥diff_threshold (equal to or more than the threshold), a value indicating "strong" is output as the ringing occurrence level 110. If diff<diff_threshold (less than the threshold), a value indicating "weak" is output as the ringing occurrence level 110. Although the above description has exemplified the case in which either "strong" or "weak" is output as the ringing occurrence level 110 in accordance with whether diff is equal to or more than one threshold, it is possible to express the ringing occurrence level 110 with a finer level by using two or more thresholds.

In this manner, the processing following the flowchart of FIG. 3 can obtain the ringing occurrence levels 110 for the respective input coordinate points 109 obtained by the deformation control unit 103 (with respect to the input coordinate point 109 obtained concerning each output coordinate point on the output image 102). The significance of processing performed by the ringing determination unit 104, including the details of the processing in step S303, will be described below with reference to FIG. 6.

Figure 6:
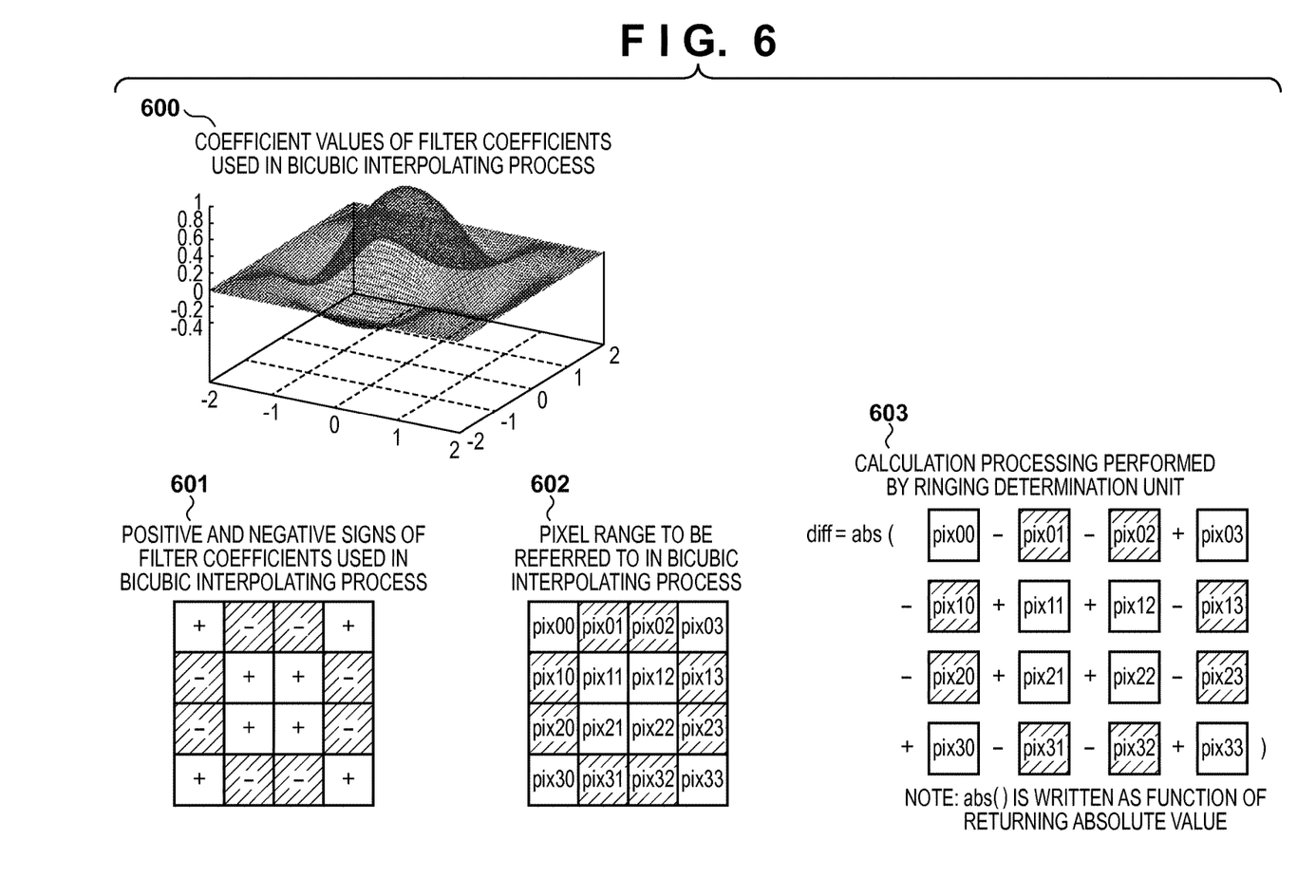
FIG. 6 is a view for explaining the significance of processing performed by the ringing determination unit 104.

A three-dimensional graph 600 indicates the coefficient values of the filter coefficients 107 used in a bicubic interpolating process. This graph is obtained by plotting the values of weighting coefficients for the respective 4×4 pixels to be referred to in pixel interpolation processing along the Z-axis. These coefficients are known. It is possible to change the sharpness of the output image 102 by changing the curve of the coefficients. The filter coefficients have a feature that those having low sharpening effects do not easily cause ringing, whereas those having high sharpening effects easily cause ringing. Each of these coefficients has a positive or negative effect on a corresponding pixel as indicated by the signs (601) of the filter coefficients 107 used in a bicubic interpolating process. For example, in a flat portion where the pixel values in a 4×4 pixel range are the same, the results obtained by the convolution operation of the respective coefficients and the pixel values are equal to the original pixel values because the positive and negative signs of the coefficients cancel each other. In contrast to this, in a non-flat portion where the 4×4 pixels are arranged such that each pixel value with coefficient "+" is high, and each pixel value with coefficient "−" is low, convolution operation results are calculated to be larger than the original pixel values because the influence of coefficient "+" increases as a result of a decrease in the reducing effect on each portion with coefficient "−". This phenomenon causes ringing in the output image 102.

For this reason, the ringing determination unit 104 calculates the ringing occurrence level 110 on the ground of how much the pixel values in a 4×4 pixel range on the input image 101 match the filter coefficients 107. When numbers are assigned to the respective pixels in a pixel range to be referred to in a bicubic interpolating process as indicated by reference numeral 602, the ringing determination unit 104 obtains diff according to an equation indicated by reference numeral 603. The equation indicated by reference numeral 603 is to calculate the absolute value of the result obtaining by adding each pixel value with coefficient "+" and subtracting each pixel value with coefficient "−". If the value of diff as this calculation result is small, it is regarded that the respective pixel values in the pixel range to be referred to do not match the filter coefficients 107, and ringing does not easily occur. On the other hand, if the value of diff as the calculation result is large, it is regarded that the respective pixel values in the pixel range to be referred to match the filter coefficients 107, and ringing easily occurs. Although this calculation can be regarded as a kind of edge detection processing, this technique has its feature in the determination of the degree of matching with the filter coefficients 107. This feature makes it possible to properly determine that ringing easily occurs even if the filter coefficients 107 are not those used in a bicubic interpolating process.

Figure 5:
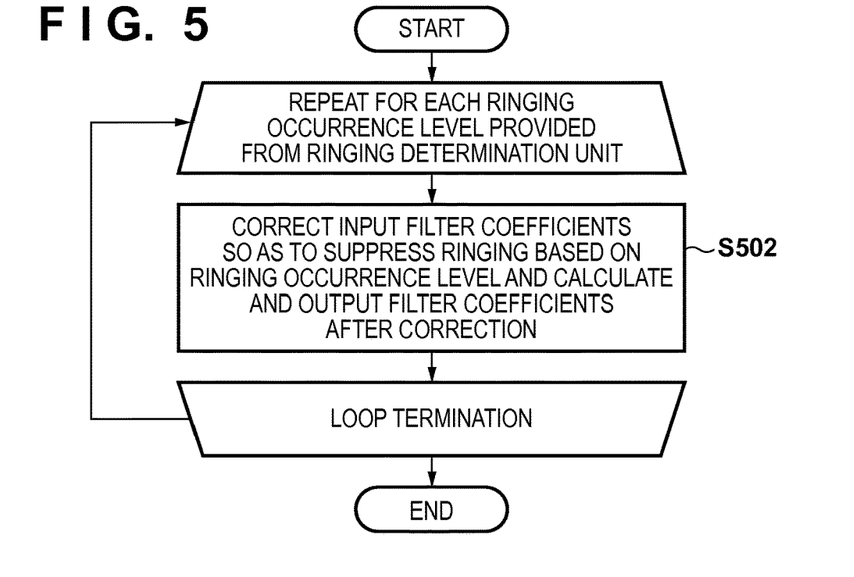
FIG. 5 is a flowchart showing processing performed by a filter coefficient calculation unit 105.

Referring back to FIG. 1, a filter coefficient calculation unit 105 receives the filter coefficients 107 and the ringing occurrence levels 110, and outputs filter coefficients 111 after correction which are obtained by correcting the filter coefficients 107 so as to suppress ringing in accordance with the ringing occurrence level 110. Processing performed by the filter coefficient calculation unit 105 will be described with reference to the flowchart of FIG. 5. In the flowchart of FIG. 5, upon receiving the ringing occurrence level 110 from the ringing determination unit 104, the filter coefficient calculation unit 105 decides, in step S502, a filter coefficient group to be applied to a neighbor pixel group of the input coordinate point 109 corresponding to the ringing occurrence level 110 in the input image 101.

More specifically, in step S502, the filter coefficient calculation unit 105 corrects the filter coefficients 107 so as to suppress ringing in accordance with the ringing occurrence level 110, and generates and outputs the filter coefficients 111 after the correction.

If, for example, the ringing occurrence level 110 of a given input coordinate point 109 is "weak" (ringing does not easily occur), the filter coefficients 107 are output as they are as the filter coefficients 111 after correction. In contrast to this, if the ringing occurrence level 110 of a given input coordinate point 109 is "strong" (ringing easily occurs), the filter coefficient calculation unit 105 adjusts the filter coefficients 107 so as to reduce the sharpening effect, and outputs the resultant coefficients as the filter coefficients 111 after the correction (adjustment). As a result, the filter coefficients 111 after the correction are set such that filter coefficients having high sharpening effects are applied to a place where ringing does not easily occur, and filter coefficients having low sharpening effects are applied to a place where ringing easily occurs. With the above processing performed by the filter coefficient calculation unit 105, the filter coefficients 111 are established for the respective input coordinate points 109.

Referring back to FIG. 1, the pixel interpolation unit 106 receives the input image 101, the filter coefficients 111 after the correction, and the input coordinate point 109. The pixel interpolation unit 106 obtains a pixel value at the output coordinate point on the output image 102 which corresponds to the input coordinate point 109 by performing pixel interpolation by applying the filter coefficients 111 corresponding to the input coordinate point 109 to the neighbor pixel groups of the input coordinate point 109 on the input image 101.

Figure 4:
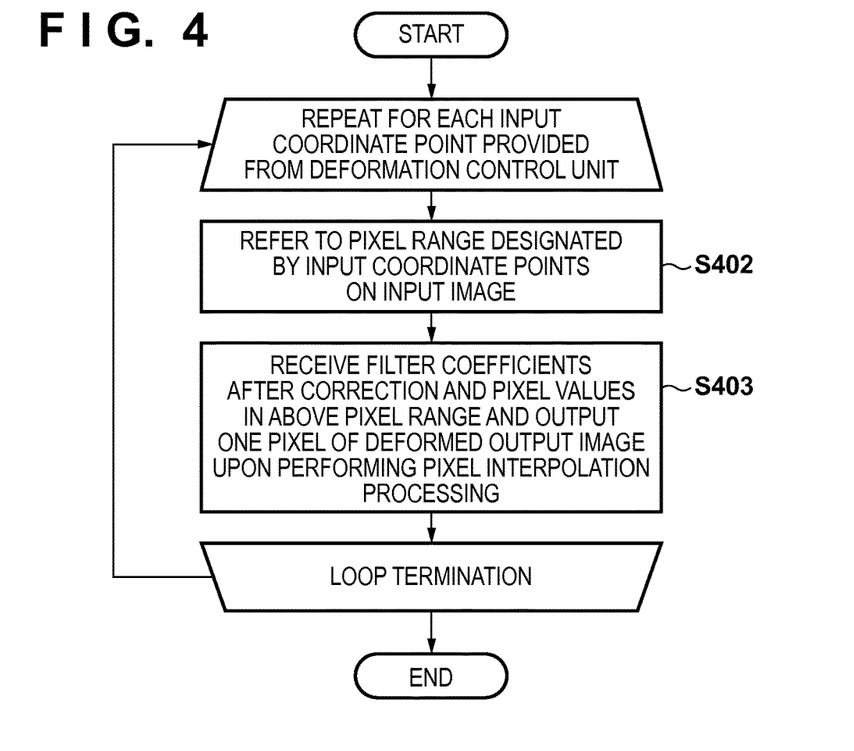
FIG. 4 is a flowchart of processing performed by a pixel interpolation unit 106.

Processing performed by the pixel interpolation unit 106 will be described with reference to the flowchart of FIG. 4. According to the flowchart of FIG. 4, a pixel value at the output coordinate point on the output image 102 which corresponds to the input coordinate point 109 is obtained by performing, for each input coordinate point 109, pixel interpolation of the neighbor pixel groups of the input coordinate point 109 on the input image 101 using the filter coefficients 111 after the correction which correspond to the input coordinate point 109.

In step S402, a pixel group constituted by a total of 16 pixels including 4 pixels (2×2 pixels) surrounding the input coordinate point 109 on the input image 101 and 12 pixels surrounding the 4 pixels is specified. In step S403, a pixel value at corresponding output coordinate point is obtained by performing pixel interpolation processing by performing a convolution operation using the filter coefficients 111 after correction to the pixel group specified in step S402.

Performing the processing in steps S402 and S403 with respect to the respective input coordinate points 109 makes it possible to decide pixel values at output coordinate points corresponding to the input coordinate points 109. As a consequence, pixel values are established at the respective pixel positions on the output image 102. After the processing following the flowchart of FIG. 4, the pixel interpolation unit 106 outputs the output image 102 completed in this manner. The output destination is not limited to any specific output destination. The image may be output to a memory in the apparatus or an external apparatus or may be output to some suitable display device to make it display the image.

As described above, according to this embodiment, deformation is performed by applying filter coefficients having high sharpening effects to a portion of the input image 101 in which ringing does not easily occur. On the other hand, deformation is performed by applying filter coefficients which have low sharpening effects but do not easily cause ringing to a portion in which ringing easily occurs. Since the type of processing to be applied to each pixel is changed in accordance with easy occurrence of ringing in this manner, the above technique has the effect of suppressing ringing while maintaining high sharpening effects as compared with the related art. That is, the above technique changes the type of processing in accordance with the easy change in color of each pixel, and hence has the effect of suppressing a change in color while maintaining high sharpening effects as compared with the related art.

Second Embodiment

The following will mainly describe differences from the first embodiment, and a description of the same portions as those in the first embodiment will be omitted. That is, they are the same as those in the first embodiment unless otherwise specified.

Figure 7:
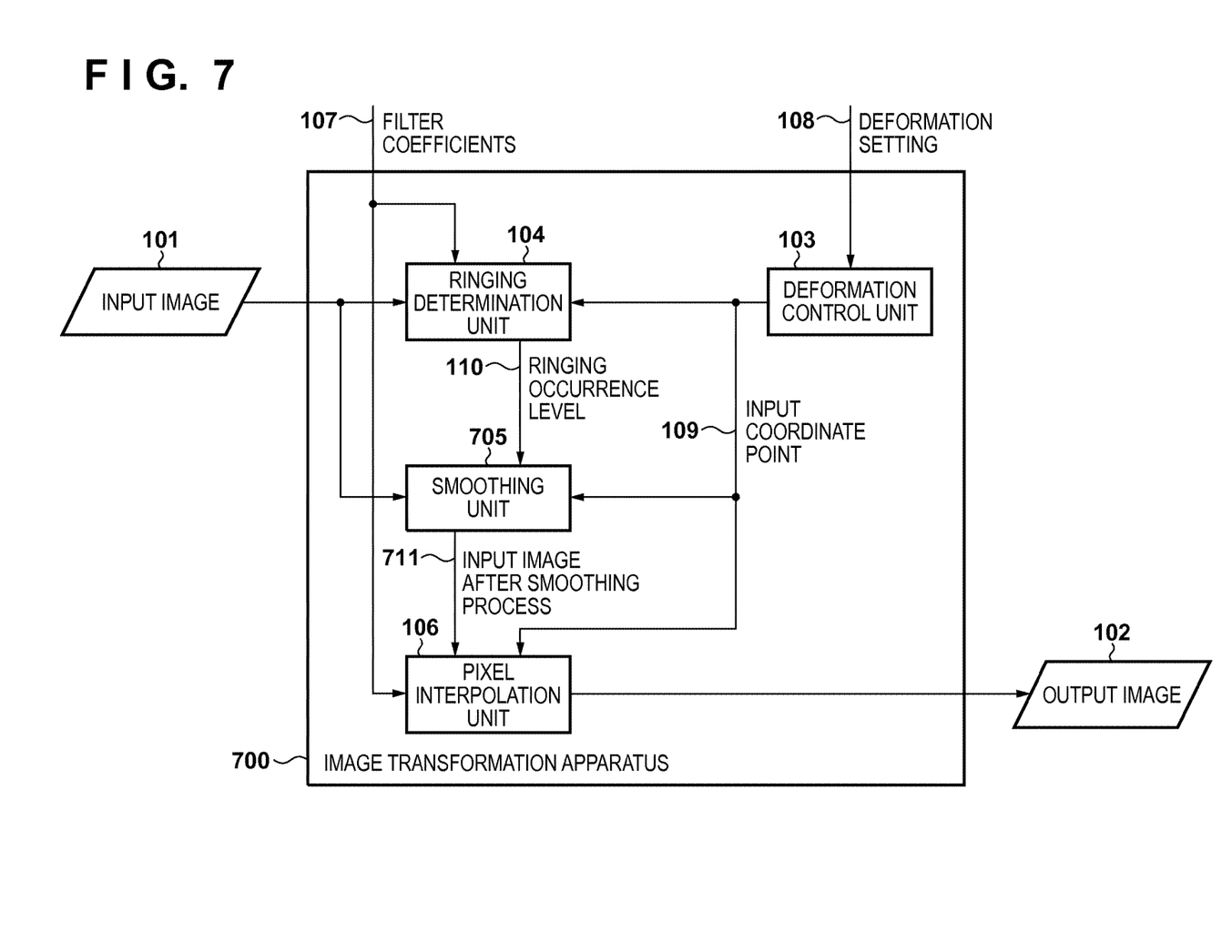
FIG. 7 is a block diagram showing an example of the functional arrangement of an image transformation apparatus 700.

An example of the functional arrangement of an image transformation apparatus 700 according to this embodiment will be described with reference to the block diagram of FIG. 7. The same reference numerals as in FIG. 1 denote the same functional units in FIG. 7, and a description concerning such functional units will be omitted. The arrangement shown in FIG. 7 is obtained by replacing the filter coefficient calculation unit 105 in the arrangement shown in FIG. 1 with a smoothing unit 705. Therefore, the following will mainly describe the smoothing unit 705.

Figure 8:
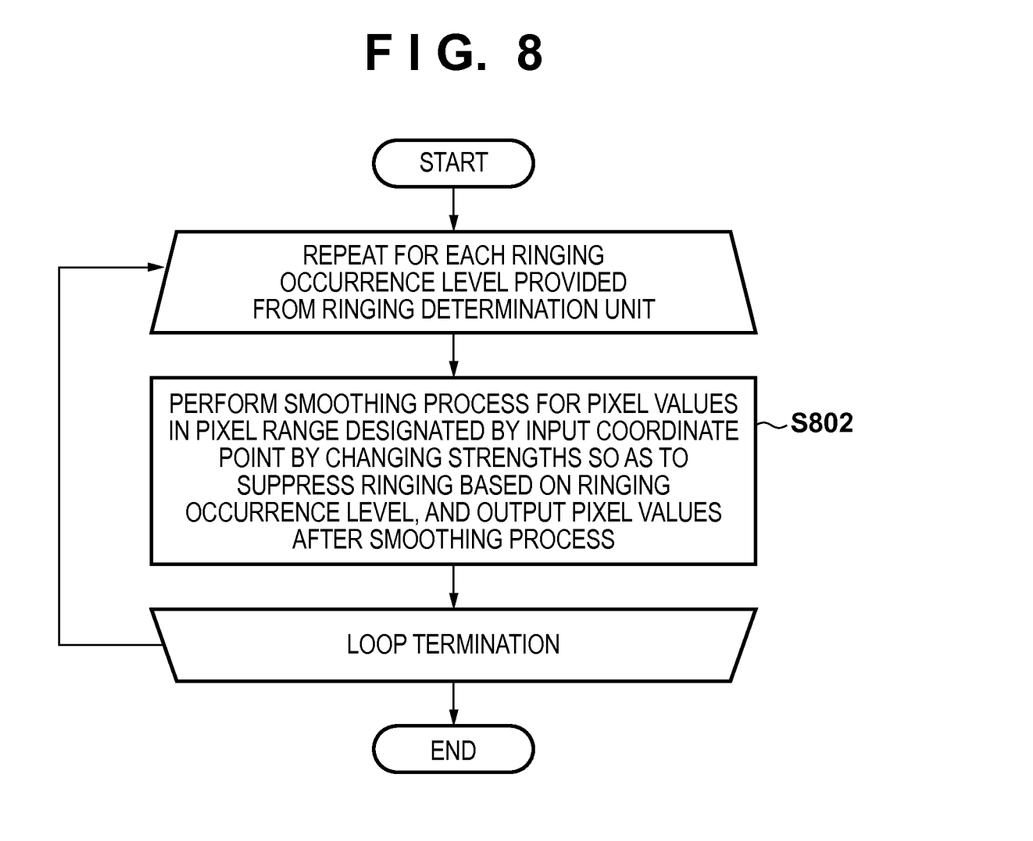
FIG. 8 is a flowchart of processing performed by a smoothing unit 705.

The smoothing unit 705 receives filter coefficients 107, ringing occurrence levels 110, and an input image 101, and applies a smoothing process (low-pass filter process) to a portion in which ringing easily occurs, thereby outputting an input image 711 after the smoothing process. Processing performed by the smoothing unit 705 will be described with reference to the flowchart of FIG. 8. In the flowchart of FIG. 8, the smoothing unit 705 performs a smoothing process, for each input coordinate point 109, of the pixel values of a neighbor pixel group of the input coordinate point 109 on the input image 101 so as to suppress ringing in accordance with the ringing occurrence level 110 obtained with respect to the input coordinate point 109.

More specifically, in step S802, upon receiving the input coordinate point 109 from the deformation control unit 103, the smoothing unit 705 specifies neighbor pixels of the input coordinate point 109 on the input image 101. The smoothing unit 705 then performs a smoothing process by changing the pixel values of the neighbor pixels so as to suppress ringing based on the ringing occurrence level 110 obtained by the ringing determination unit 104 concerning the input coordinate point 109. For example, on the input image 101, the smoothing unit 705 performs the above smoothing process of only the neighbor pixels (area) of the input coordinate point 109 at which the ringing occurrence level 110 is "strong", and performs no process of the neighbor pixels of the input coordinate point 109 at which the ringing occurrence level 110 is "weak". The smoothing unit 705 then outputs the input image 101 having undergone such a process as the input image 711 after the smoothing process. Although the above description has exemplified the bicubic interpolating process which refers to a 4×4 pixel range, it is possible to perform another type of pixel interpolation processing with a different pixel range to be referred to.

The first and second embodiments described above can be applied to image transformation process, and can be applied to, for example, keystone (trapezoidal)/curved surface/free deformation processing for a projector or scaling processing for a display.

Third Embodiment

Each functional unit constituting the image transformation apparatuses 100 and 700 shown in FIGS. 1 and 7 may be implemented by hardware or software (computer programs).

In the former case, each functional unit may be implemented as a discrete device or implemented by dedicated hardware in one apparatus. In the latter case, any apparatus which can execute computer programs for causing a processor such as a CPU to execute the function of each functional unit can be applied to the image transformation apparatus. Obviously, the present invention is not limited to a case in which each functional unit is implemented by only hardware or software. Some functions may be implemented by either hardware or software. According to the arrangement of the present invention, it is possible to perform image deformation while suppressing ringing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-016199, filed Jan. 30, 2014 which is hereby incorporated by reference herein in its entirety.

What is claimed is:

1. An image processing apparatus which outputs a transformation image obtained from an input image, the apparatus comprising:
 one or more hardware processors which cause the image processing apparatus to:
  specify a plurality of coordinate points on the input image which corresponds to a coordinate point on the transformation image;
  determine an evaluation value for the coordinate point on the transformation image on the basis of a plurality of pixel values corresponding to the specified plurality of coordinate points on the input image;
  determine, based on the evaluation value which is determined for the coordinate point on the transformation image on the basis of the plurality of pixel values corresponding to the specified plurality of coordinate points on the input image, a parameter regarding a bicubic interpolating process for the plurality of pixel values corresponding to the specified plurality of coordinate points on the input image, wherein an edge enhancement degree by the bicubic interpolating process varies according to the parameter;
  execute the bicubic interpolating process, using the parameter which is determined based on the evaluation value, on the plurality of pixel values corresponding to the specified plurality of coordinate points on the input image to obtain a pixel value corresponding to the coordinate point on the transformation image; and
  output, as a pixel value of the transformation image, the pixel value obtained by executing the bicubic interpolating process on the plurality of pixel values corresponding to the specified plurality of coordinate points on the input image,
  wherein an interpolating process other than the bicubic interpolating process is not executed to obtain the transformation image.

2. The apparatus according to claim 1, wherein the specified plurality of coordinate points on the input image are classified into a first group and a second group, and the evaluation value is determined based on an absolute value of a difference between a sum of a plurality of pixel values corresponding to a plurality of coordinate points belonging to the first group and a sum of a plurality of pixel values corresponding to a plurality of coordinate points belonging to the second group.

3. The apparatus according to claim 1, wherein the one or more hardware processors further cause the image processing apparatus to acquire a deformation parameter for deformation process for obtaining the transformation image, and
 wherein the plurality of coordinate points on the input image which corresponds to the coordinate point on the transformation image are specified by using the deformation parameter.

4. The apparatus according to claim 1, wherein the one or more hardware processors further cause the image processing apparatus to generate a correction parameter smaller in edge enhancement degree than a default parameter by correcting the default parameter,
 wherein the bicubic interpolating process, which is executed on the plurality of pixel values on the input image by using the correction parameter, is executed in a case where the evaluation value is not less than a threshold, and
 wherein the bicubic interpolating process, which is executed on the plurality of pixel values on the input image by using the default parameter, is executed in a case where the determined evaluation value is less than the threshold.

5. The apparatus according to claim 4, wherein the correction parameter is generated based on the determined evaluation value that is not less than the threshold.

6. The apparatus according to claim 4, wherein the one or more hardware processors further cause the image processing apparatus to determine a ringing occurrence level based on the determined evaluation value, and
 wherein the correction parameter is generated based on the determined ringing occurrence level.

7. The apparatus according to claim 1, wherein the parameter is a coefficient value for the bicubic interpolating process, and
 wherein a higher coefficient value is determined when the determined evaluation value represents that a ringing does not easily occur in comparison with a case where the determined evaluation value represents that the ringing easily occurs.

8. An image processing method of outputting a transformation image obtained from an input image, the method comprising:
 specifying a plurality of coordinate points on the input image which corresponds to a coordinate point on the transformation image;
 determining an evaluation value for the coordinate point on the transformation image on the basis of a plurality of pixel values corresponding to the specified plurality of coordinate points on the input image;
 determining, based on the evaluation value which is determined for the coordinate point on the transformation image on the basis of the plurality of pixel values corresponding to the specified plurality of coordinate points on the input image, a parameter regarding a bicubic interpolating process for the plurality of pixel values corresponding to the specified plurality of coordinate points on the input image, wherein an edge enhancement degree by the bicubic interpolating process varies according to the parameter;
 executing the bicubic interpolating process, using the parameter which is determined based on the evaluation value, on the plurality of pixel values corresponding to the specified plurality of coordinate points on the input image to obtain a pixel value corresponding to the coordinate point on the transformation image; and
 outputting, as a pixel value of the transformation image, the pixel value obtained by executing the bicubic interpolating process on the plurality of pixel values corresponding to the specified plurality of coordinate points on the input image,
 wherein an interpolating process other than the bicubic interpolating process is not executed to obtain the transformation image.

9. A non-transitory computer-readable storage medium storing a program for causing a computer, which outputs a transformation image obtained from an input image, to execute:

specifying a plurality of coordinate points on the input image which corresponds to a coordinate point on the transformation image;

determining an evaluation value for the coordinate point on the transformation image on the basis of a plurality of pixel values corresponding to the specified plurality of coordinate points on the input image;

determining, based on the evaluation value which is determined for the coordinate point on the transformation image on the basis of the plurality of pixel values corresponding to the specified plurality of coordinate points on the input image, a parameter regarding a bicubic interpolating process for the plurality of pixel values corresponding to the specified plurality of coordinate points on the input image, wherein an edge enhancement degree by the bicubic interpolating process varies according to the parameter;

executing the bicubic interpolating process, using the parameter which is determined based on the evaluation value, on the plurality of pixel values corresponding to the specified plurality of coordinate points on the input image to obtain a pixel value corresponding to the coordinate point on the transformation image; and outputting, as a pixel value of the transformation image, the pixel value obtained by executing the bicubic interpolating process on the plurality of pixel values corresponding to the specified plurality of coordinate points on the input image, wherein an interpolating process other than the bicubic interpolating process is not executed to obtain the transformation image.

* * * * *